(12) United States Patent
Lu

(10) Patent No.: US 9,710,036 B2
(45) Date of Patent: Jul. 18, 2017

(54) POWER MIXING APPARATUS OF MULTIPLE POWER SUPPLIES

(71) Applicant: Liang-Chun Lu, Tao Yuan (TW)

(72) Inventor: Liang-Chun Lu, Tao Yuan (TW)

( * ) Notice: Subject to any disclaimer, the term of this patent is extended or adjusted under 35 U.S.C. 154(b) by 0 days.

(21) Appl. No.: 14/950,047

(22) Filed: Nov. 24, 2015

(65) Prior Publication Data
US 2017/0147051 A1 May 25, 2017

(51) Int. Cl.
G06F 1/00 (2006.01)
H02J 3/14 (2006.01)
G06F 1/26 (2006.01)
G06F 1/32 (2006.01)

(52) U.S. Cl.
CPC ............ *G06F 1/263* (2013.01); *G06F 1/3203* (2013.01)

(58) Field of Classification Search
CPC ...................................... G06F 1/3203
USPC ......................................... 713/300
See application file for complete search history.

(56) References Cited

U.S. PATENT DOCUMENTS

| | | | | |
|---|---|---|---|---|
| 5,909,583 A * | 6/1999 | Hayes | ..................... | G06F 1/263 713/300 |
| 6,040,982 A * | 3/2000 | Gandre | ................... | G06F 1/184 307/64 |
| 6,369,699 B1 * | 4/2002 | Liu | ......................... | H04B 3/54 332/119 |
| 6,710,621 B2 * | 3/2004 | Devlin | ...................... | G06F 1/26 326/38 |
| 7,005,760 B2 * | 2/2006 | Eaton | ........................ | H02J 9/06 307/116 |
| 7,443,053 B2 * | 10/2008 | Chen | ....................... | G06F 1/263 307/44 |
| 7,906,871 B2 * | 3/2011 | Freeman | ................. | G06F 1/263 307/43 |
| 8,214,664 B2 * | 7/2012 | Lin | ......................... | G06F 1/263 713/300 |
| 8,775,846 B2 * | 7/2014 | Robinson | ................ | G06F 1/263 323/318 |
| 9,459,674 B2 * | 10/2016 | Lin | ........................ | G06F 1/263 |
| 9,501,121 B2 * | 11/2016 | Takarada | ................ | G06F 1/263 |
| 2013/0043727 A1 * | 2/2013 | Liu | .......................... | G06F 1/26 307/31 |
| 2014/0019777 A1 * | 1/2014 | Shih | ........................ | G06F 1/26 713/300 |

\* cited by examiner

*Primary Examiner* — Suresh Suryawanshi
(74) *Attorney, Agent, or Firm* — Jackson IPG PLLC; Demian K. Jackson

(57) ABSTRACT

The present invention relates to a power mixing apparatus of multiple power supplies, which comprises a plurality of power mixing units and a power control unit. The power control unit receives a control signal to control the switching states of the power supplies. The power mixing units are individually connected to the power supplies and a mother board. The power mixing units receive and couple a plurality of operating powers of the power supplies correspondingly to generate a plurality of stable output powers for the mother board such that the effects of increased output powers and supply balance can be achieved.

12 Claims, 9 Drawing Sheets

POWER MIXING APPARATUS OF MULTIPLE POWER SUPPLIES

BACKGROUND OF THE INVENTION

Field of the Invention

The present invention relates to a power mixing apparatus of multiple power supplies and, in particular, to a power mixing apparatus of multiple power supplies, which can mix different voltages and the powers of the multiple power supplies to achieve the effects of increased output powers and supply balance.

Description of Prior Art

With the rapid progress of computer industry, the power supply has become one of the indispensable products. In general, when a personal computer is assembled, an adequate power supply is selected depending on the power consumption of the computer system. The main function of the power supply is to provide the power and voltages for the mother board, the CUP, the CD driver, the HD driver, the fan, and the independent display card.

However, due to the development of high-level products, the power consumption of the personal computer increases accordingly, which results in a gradual increase in the loading of the power supply. If the power provided from the power supply is unstable or insufficient for the personal computer, the minor impact on the computer will be a crash and loss of data within the computer, while the major impact on the computer will damage the high-level products in the computer. Therefore, users usually face the problem of insufficient power provided by the original power supply for the upgraded computer and then they have to buy a new power supply with a larger capacity to meet the power requirements of the updated computer. Such a way not only increases the hardware cost during the computer upgrade, but also wastes the resource in which the intact power supply is replaced.

SUMMARY OF THE INVENTION

Thus, to effectively overcome the above problems, one objective of the present invention is to provide a power mixing apparatus of multiple power supplies, which can mix different voltages of the multiple identical or different power supplies through plural power mixing units to increase the output powers. As such, the effects of providing the required power for a mother board and balancing the supply can be achieved.

Another objective of the present invention is to provide a power mixing apparatus of multiple power supplies, which has a function of uninterruptible power supply.

To achieve the above objectives, the present invention provides a power mixing apparatus of multiple power supplies, which comprises a plurality of power mixing units and a power control unit. The power mixing units are individually connected to a plurality of power supplies and a mother board. The power mixing units receive and couple a plurality of operating powers of the power supplies correspondingly to generate a plurality of stable averaged output voltages for the mother board. The power control unit is connected to the power supplies and the mother board. The power control unit controls the switching states of the power supplies according to a control signal transmitted from the mother board. By means of the design of the power mixing apparatus of the present invention, the voltages of the multiple identical or different power supplies can be mixed to increase the whole output powers. As such, the effects of providing the required power for the mother board and the CPU thereon and balancing the supply can be achieved

DETAILED DESCRIPTION OF THE INVENTION

Figure 1:
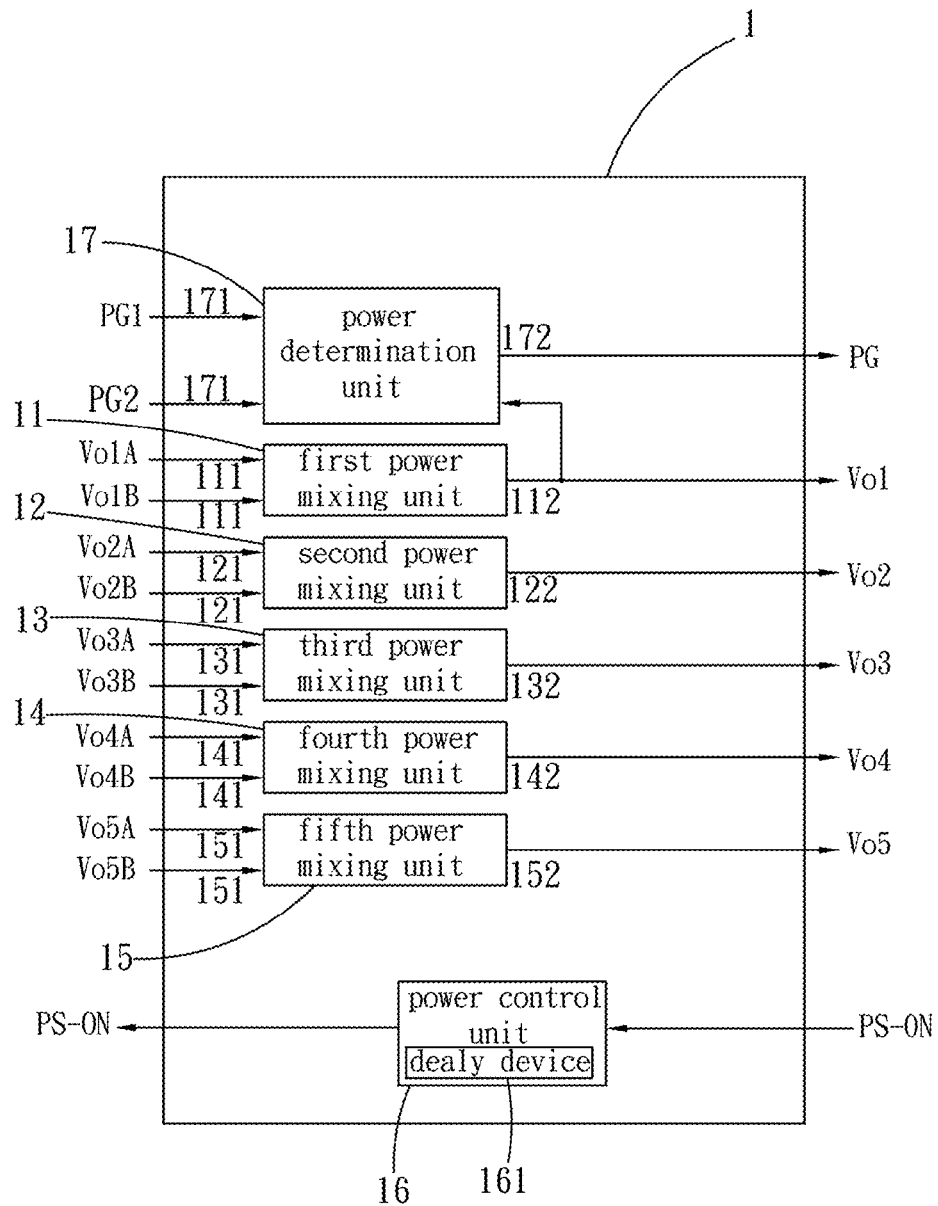
FIG. 1 shows the block diagram of the power mixing apparatus according to the first embodiment of the present invention.

The above objectives of the present invention and the features of structure and function of the present invention are described according to the preferred embodiments in figures.

The present invention provides a power mixing apparatus of multiple power supplies. Please refer to FIGS. 1, 3A, and 3B, which show the block diagrams of the power mixing apparatus according to the first embodiment of the present invention. The power mixing apparatus 1 is applied in a computer system 4 such as a personal computer. The power mixing apparatus 1 comprises a plurality of power mixing units 11, 12, 13, 14, a power control unit 16, and a power determination unit 17. The power mixing units 11, 12, 13, 14 are individually connected to a plurality of power supplies 3 and a mother board 41 of the computer system 4. Also, the power mixing units 11, 12, 13, 14 receive and then filter-couple (or filter-mix) a plurality of operating powers provided from the power supplies 3 correspondingly to generate a plurality of stable output powers for the mother board 41 and the CPU 42 thereon.

In total, there are five DC operating powers, 5VSB, 5V, 3.3V, −12V, and 12V, provided from the power supplies 3 in the current embodiment for explanation. The above-mentioned power supplies 3 are at an on state (i.e., the power supplies 3 turn on) and provide DC powers, 5V, 3.3 V, −12 V, and 12 V, while the power supplies 3 are at an idle state (i.e., the power supplies 3 turn off) and do not provide operating powers. Only the above-mentioned 5VSB always exists and is used as operating power for the computer system 4 at an idle state. That is, the power supplies 3 provide the operating power of 5VSB when it is at an on state or at an idle state.

In the current embodiment, there are five output powers, 5VSB, 5V, 3.3V, −12V, and 12V, generated (or output) by the above-mentioned power mixing units for the mother board 41 and the CPU 42 thereon. The powers of the peripheral devices 43 such as the independent display card, the HD driver, and the CD driver are directly provided from the power supplies 3 like 5V, 12V, and −12V, not through the operating powers, which is used for explanation, but not limited to this. In other embodiments, the powers of the peripheral devices 43 can also come from the output powers of the power mixing apparatus 1.

In addition, the power mixing units comprises a first power mixing unit 11, a second power mixing unit 12, a third power mixing unit 13, a fourth power mixing unit 14, and a fifth power mixing unit 15. Each of the first, second, third, fourth, and fifth power mixing units 11, 12, 13, 14, 15 has a plurality of first connecting ends 111, 121, 131, 141, 151 and at least one second connecting end 112/122/132/142/152. The first connecting ends 111/121/131/141/151 are connected to the power supplies 3 correspondingly. The second connecting ends 112, 122, 132, 142, 152 are connected to the mother board 41. The plural power supplies 3 in the current embodiment will be two power supplies for explanation. That is, the power supplies 3 comprise a first power supply 31 and a second power supply 32. Each of the first and second power supplies 31, 32 has at least one first power end 311/321, at least one second power end 312/322, at least one third power end 313/323, at least one fourth power end 314/324, and at least one fifth power end 315/325, and a PG (Power Good) end 316/326. The first, second, third, fourth, and fifth power ends 311, 312, 313, 314, 315 of the first power supply 31 are connected to the first connecting ends 111, 121, 131, 141, 151 of the first, second, third, fourth, and fifth power mixing units 11, 12, 13, 14, 15, respectively. The first, second, third, fourth, and fifth power ends 321, 322, 323, 324,325 of the second power supply 32 are connected to the other first connecting ends 111, 121, 131, 141, 151 of the first, second, third, fourth, and fifth power mixing units 11, 12, 13, 14, 15, respectively.

The PG ends 316, 326 of the above-mentioned first and second power supplies 31, 32 are used to output a first power good signal PG1 and a second power good signal PG2, respectively. The first and the second power good signals PG1, PG2 mean the first and second power supplies 31, 32 have generated stable signals of the operating powers when the first and second power supplies 31, 32 turn on in a steady state, respectively. Therefore, after the first power supply 31 turns on in a steady state, it will generate the first power good signal PG1; after the second power supply 32 turns on in a steady state, it will generate the second power good signal PG2. In this way, the first and second power good signals PG1, PG2 are used to signal (or report) the mother board 41 that the first and second power supplies 31, 32 have generated the stable operating powers. The operating voltages Vo1A-Vo5A, Vo1B-Vo5B output by the first, second, third, fourth, and fifth power ends 311-315, 321-325 of the first and second power supplies 31, 32 will be explained in terms of 5VSB, 5V, 3.3V, −12V, and 12V, respectively, but not limited to this. The number of the above-mentioned power supplies is not limited to two. When the present invention is to be implemented, the user can increase the number of the power supplies 3 depending on the required watt value (i.e., the required power) of the mother board 41 and the CPU 42 thereon or the upgraded peripheral devices 43 to meet the required watt value after upgrade.

Moreover, the first connecting ends 111 of the first power mixing unit 11 receive the operating voltages Vo1A, Vo1B (e.g., 5VSB) provided from the first power ends 311, 321 of the first and second power supplies 31, 32 and filter-couple (or filter-mix) the operating powers Vo1A, Vo1B to generate a stable first output power Vo1 (e.g., 5VSB). The first connecting ends 121 of the second power mixing unit 12 receive the operating voltages Vo2A, Vo2B (e.g., 5V) provided from the second power ends 312, 322 of the first and second power supplies 31, 32 and couple the operating powers Vo2A, Vo2B to generate a stable second output power Vo2 (e.g., 5V). The first connecting ends 131 of the third power mixing unit 13 receive the operating voltages Vo3A, Vo3B (e.g., 3.3V) provided from the third power ends 313, 323 of the first and second power supplies 31, 32 and couple the operating powers Vo3A, Vo3B to generate a stable third output power Vo3 (e.g., 3.3V). The first connecting ends 141 of the fourth power mixing unit 14 receive the operating voltages Vo4A, Vo4B (e.g., −12V) provided from the fourth power ends 314, 324 of the first and second power supplies 31, 32 and couple the operating powers Vo4A, Vo4B to generate a stable fourth output power Vo4 (e.g., −12V). The first connecting ends 151 of the fifth power mixing unit 15 receive the operating voltages Vo5A, Vo5B (e.g., 12V) provided from the fifth power ends 315, 325 of the first and second power supplies 31, 32 and couple the operating powers Vo5A, Vo5B to generate a stable fifth output power Vo5 (e.g., 12V). The voltages of the first, second, third, fourth, and fifth output voltages Vo1-Vo5 differ from one another.

The output powers (i.e., the first, second, third, fourth, and fifth output powers Vo1-Vo5) are individually provided from the second connecting ends 112, 122, 132, 142, 152 of the first, second, third, fourth, and fifth power mixing units 11, 12, 13, 14, 15 for the mother board 41 and the CPU 42 thereon. The first output power Vo1 is also provided for the power determination unit 17 as the power source. Besides, because the five operating powers (i.e., 5VSB, 5V, 3.3V, −12V, 12V) provided from the two power supplies 31, 32 can have different or the same voltage values (e.g. having an allowable deviation of +/−5% in the operating voltage according to manufacturing specifications), the operating powers provided from the two power supplies 31, 32 are filter-coupled or filter-mixed in sequence through the power mixing units. Then, the stable output powers (i.e., the first, second, third, fourth, and fifth output powers Vo1-Vo5) are output in sequence through the second connecting ends 112, 122, 132, 142, 152 of the power mixing units (i.e., the first, second, third, fourth, and fifth power mixing units 11, 12, 13, 14, 15) for the mother board 41 and the CPU 42 thereon. For example, the second power end 312 of the first power supply 31 provides a power voltage of 4.8V; the second power end 322 of the second power supply 32 provides a power voltage of 5.1V. After the operating voltages Vo2A, Vo2B (e.g., 4.8V, 5.1V) provided from the first and the second power supplies 31, 32 are received and then filter-coupled or filter-mixed through the second power mixing unit 12, a stable second averaged output voltage Vo2 (e.g., 4.95V) is generated and provided through the second connecting end 122 of the second power mixing unit 12 for the mother board 41. The operations of the first, third, fourth, and fifth power mixing units 11, 13, 14, 15 can be obtained in a similar way.

When the user wants to upgrade the computer system 4 and finds that two power supplies cannot provide enough power for the computer system 4 after upgrade, the user can add one or more power supplies connected to the corresponding power mixing units, which can solve the problem of the insufficient power originally provided by the two power supplies. Consequently, the original (or old) power supplies can be fully utilized, which also reduces the cost of upgrade for the computer system 4.

Therefore, by means of the power mixing apparatus 1 of the present invention, the plural power supplies having different or same voltages can be easily filter-coupled (or filter-mixed) to form a power supply having a larger power output. For example, two power supplies having the powers of 400 W and 600 W, respectively, can provide sufficient power for the mother board 41 and the CPU 42 thereon (or the peripheral devices 43) by means of the above-mentioned power mixing apparatus 1 which mixes the two power supplies to form a power supply having a power approximately of 1000 W. Thus, the required powers of the mother board 41 and the CPU 42 can be provided in balance by the two power supplies to achieve the effect of supply balance.

The power control unit 16 is connected to the power supplies 3 and the mother board 41. The mother board 41 provides a control signal PS-ON for the power control unit 16. The power control unit 16 controls the switching states of the power supplies 3 (i.e., the power supplies 3 entering an on state or an idle state) according to the control signal PS-ON transmitted from the mother board 41. In other words, when the mother board 41 operated by the user is determined to be at an on state, the mother board 41 transmits the control single PS-ON at low level to the corresponding power control unit 16. The power control unit 16 controls the power supplies 3 to enter an on state according to the control signal PS-ON received. When the mother board 41 operated by the user is determined to be at an off state, the mother board 41 transmits the control single PS-ON at high level to the corresponding power control unit 16. The power control unit 16 controls the power supplies 3 to enter an idle state according to the control signal PS-ON received.

Besides, the above-mentioned power control unit 16 is provided with a delay device 161 therein. A capacitor is used as an example of the delay device 161 in the current embodiment, but not limited to this. In this way, when the control signal PS-ON received by the power control unit 16 is at low level, a gradual increase in the voltage can be generated by the delay device 161 as a turn-on buffer mechanism, which can effectively reduce false action caused by noise. The power determination unit 17 has a plurality of input ends 171 and at least one output end 172. The PG ends 316, 326 of the first and second power supplies 31, 32 are individually connected to the corresponding input ends 171 of the power determination unit 17. The first power good signal PG1 and the second power good signal PG2 transmitted from the PG ends 316, 326 of the first and the second power supplies 31, 32 are received and determined by the power determination unit 17. Either of the first and second power good signals PG1, PG2 is at high level, the power determination unit 17 outputs a power good signal PG which is then transmitted through the output end 172 to the mother board 41 such that the mother board 41 can recognize that all the operating powers of the first and second power supplies 31, 32 have reached stable states according to the power good signal PG received. Thus, when either power supply (i.e., the first power supply 31 or the second power supply 32) has reached the stable state and output the first power good signal PG1 or the second power good signal PG2 to the power determination unit 17 such that the power determination unit 17 receives the first power good signal PG1 or the second power good signal PG2 either of which is at high level, the power good signal PG is output to the mother board 41. In this way, by means of the power determination unit 17 of the present invention, it is allowable for only one operable power supply to turn on the mother board 41 and the peripheral devices 43. For example, if one of the power supplies is damaged or operates abnormally, the other power supply can still provide power continuously for the mother board 41 and the CPU 42 by means of the power determination unit 17 to achieve the effect of uninterruptible power supply. Also, the power can be provided for the peripheral devices 43 connected to the power supply 31/32 which is damaged or operates abnormally through the power mixing units such that the peripheral devices 43 of the computer system 4 connected to the power supply 31/32 can operate normally.

The detailed implementation technology of the power mixing units of the present invention is disclosed below.

Figure 2A:
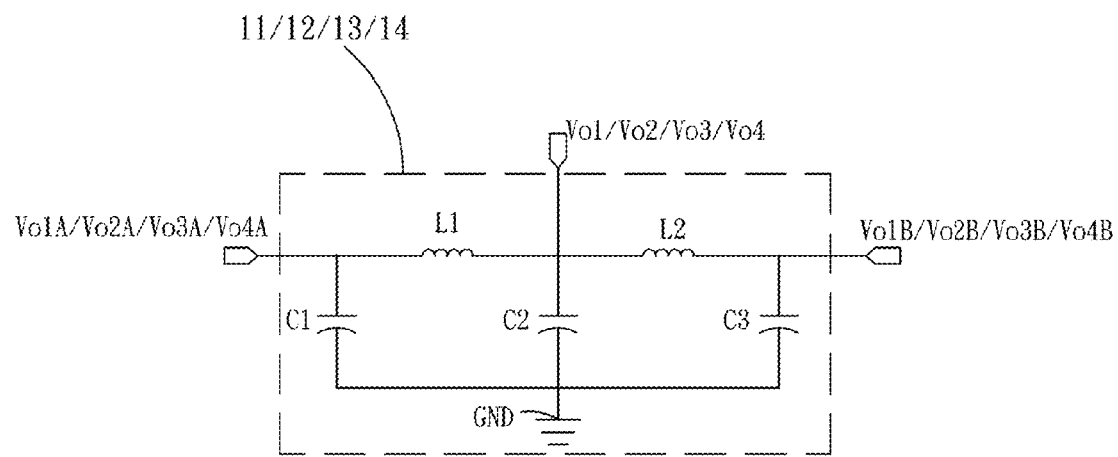
FIG. 2A shows the circuit schematic of the first, second, third, and fourth power mixing units according to the first embodiment of the present invention.
Figure 2B:
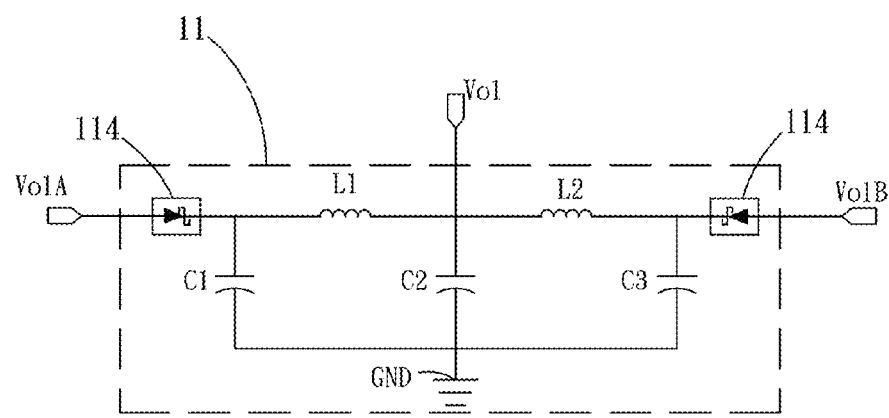
FIG. 2B shows another circuit schematic of first power mixing unit according to the first embodiment of the present invention.
Figure 2C:
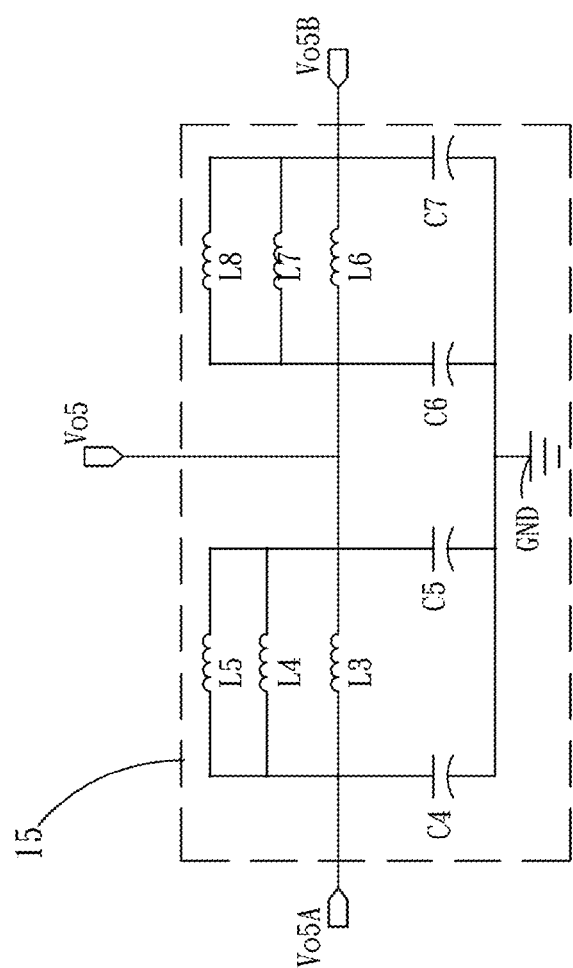
FIG. 2C shows the circuit schematic of the fifth power mixing unit according to the first embodiment of the present invention.
Figure 3A:
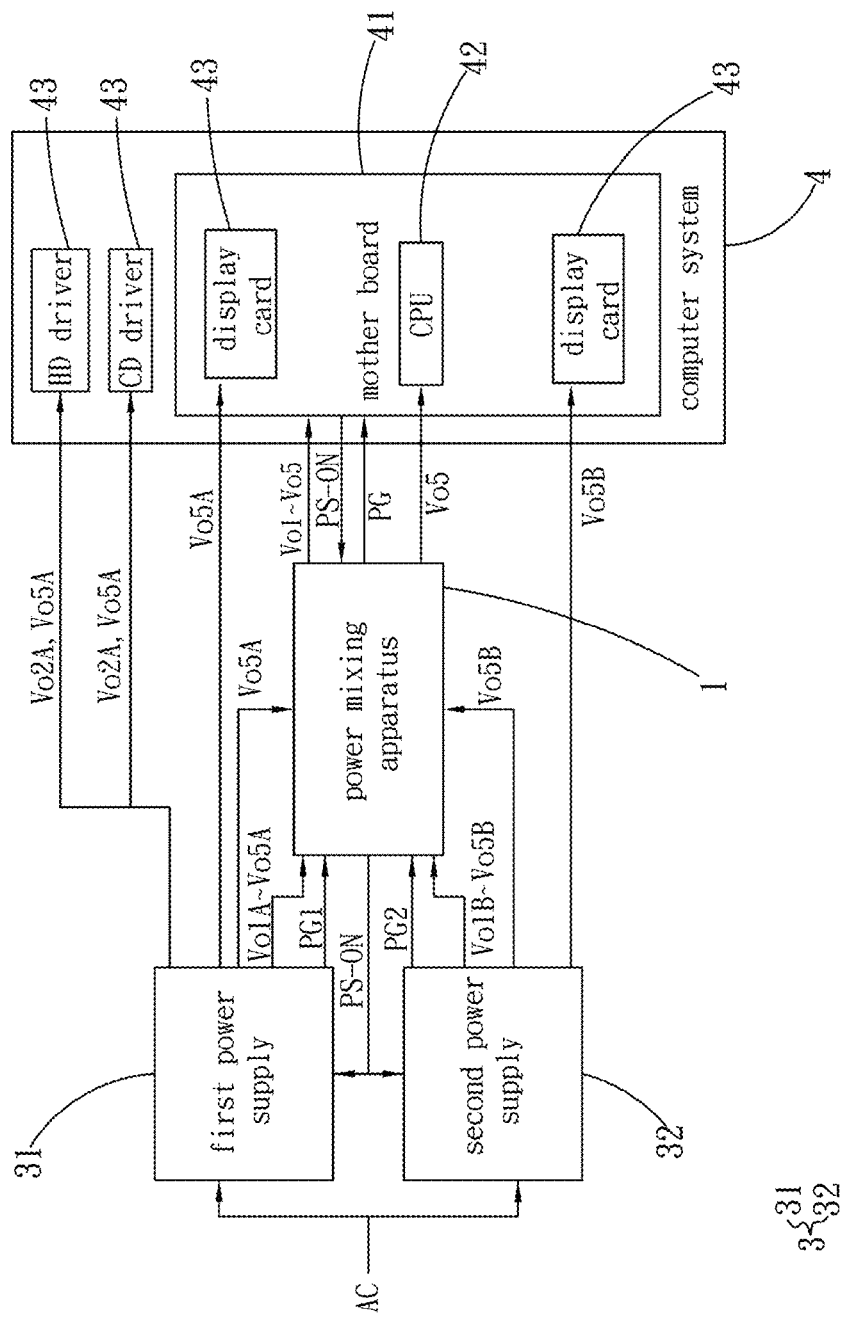
FIG. 3A shows the block diagram of the power mixing apparatus according to the first embodiment of the present invention, applied in a computer system.
Figure 3B:
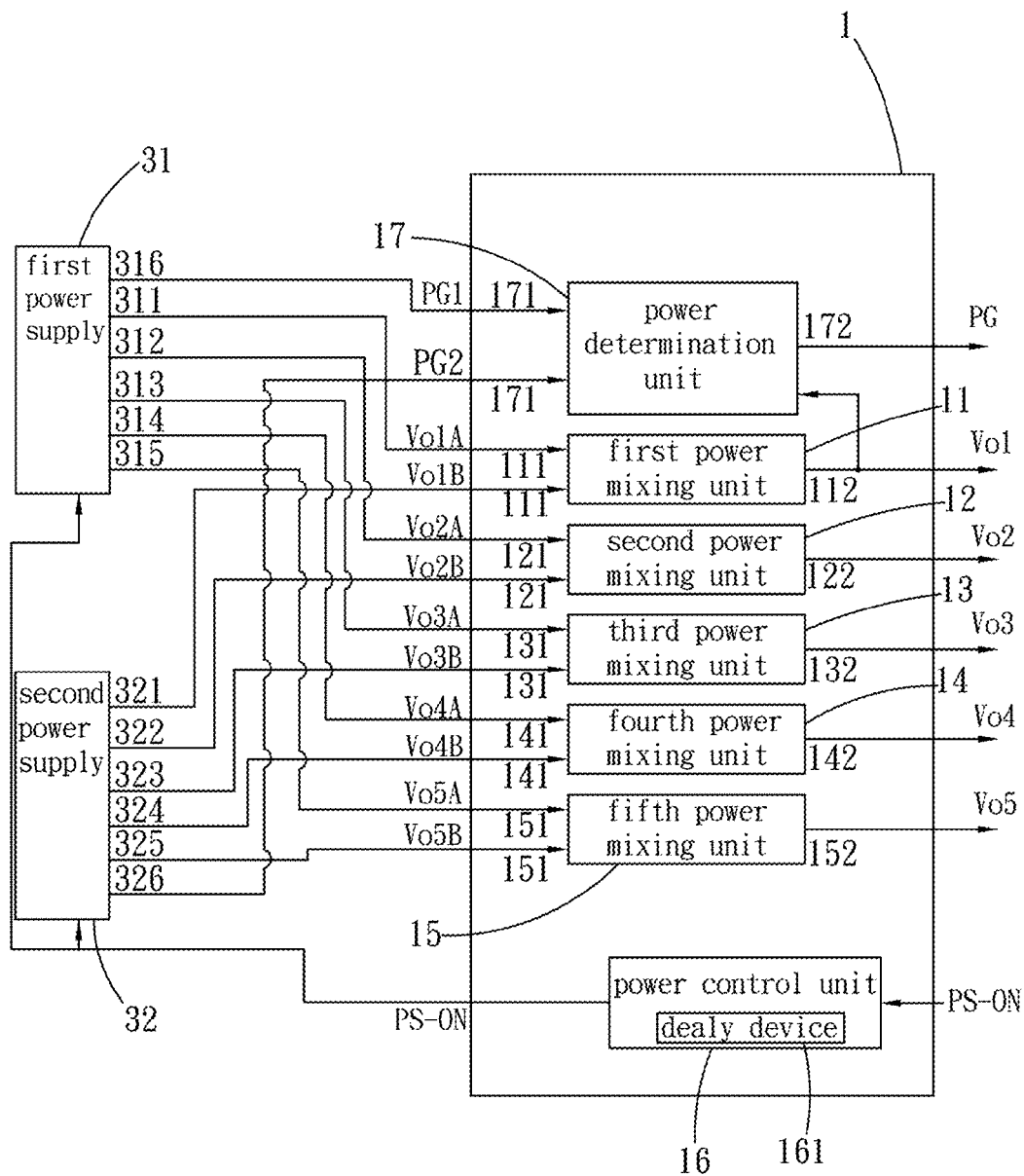
FIG. 3B shows the block diagram of the power mixing apparatus and the power supply according to the first embodiment of the present invention.

Please refer to FIGS. 2A, 2B, and 2C accompanied with FIGS. 1, 3A, and 3B. Each of the above-mentioned first, second, third, and fourth power mixing units 11, 12, 13, 14 has a first capacitor C1, a second capacitor C2, a third capacitor C3, a first inductor L1, and a second inductor L2. One end of the first inductor L1 of the first power mixing unit 11 (or the second, third, or fourth power mixing unit 12/13/14) is connected (or electrically connected) to one end of the first capacitor C1 in which the connection point thereof is the first connecting end 111 of the first power mixing unit 11 (or the first connecting end 121/131/141 of the second, third, or fourth power mixing unit 12/13/14). The other end of the first inductor L1 is connected to one end of the second capacitor C2. The other ends of the first and second capacitors C1, C2 are connected to a grounded end GND. One end of the second inductor L2 is connected to the one end of the second capacitor C2 and the other end of the first inductor L1 in which the connection point thereof is the second connecting end 122 of the first power mixing unit 11 (or the second connecting end 122/132/142 of the second, third, or fourth power mixing unit 12/13/14). The other end of the second inductor L2 is connected to one end of the third capacitor C3 in which the connection point thereof is the other first connecting end 111 of the first power mixing unit 11 (or the other first connecting end 121/131/141 of the second, third, or fourth power mixing unit 12/13/14). The other end of the third capacitor C3 is connected to the grounded end GND. The electronic components (e.g., the first, second, and third capacitors C1, C2, C3, and the first and second inductors L1, L2) of the second, third, or fourth power mixing unit 12, 13, 14 have the same structural and connecting relation as those of the first power mixing unit 11 described above; thus they are not described again here.

When the plural first connecting ends 121 of the second power mixing unit 12 receive the operating voltages Vo2A, Vo2B (e.g., 5V) provided from the second power ends 312, 322 of the first and second power supplies 31, 32, the operating voltages Vo2A, Vo2B are stabilized or averaged through the first and third capacitors C1, C3 and filtered through the first and second inductors L1, L2 and mixed at the second capacitor C2, e.g. filter-coupled or filter-mixed. In this way, different operating voltages Vo2A, Vo2B of the first and second power supplies 31, 32 can be coupled through the second capacitor C2 to generate a stable averaged output voltage (i.e., the second output power Vo2). The other output powers (i.e., the first, third, and fourth output powers Vo1, Vo3, Vo4) can operate in a similar way described above. When the present invention is to be implemented, the user can adjust the numbers of the stabilizing elements (i.e., the first and third capacitors C1, C3) and the output inductors (i.e., the second capacitor C2) based on the different designs of loading. Also, the rated withstand currents of the first and second inductors L1, L2 can be adjusted according to the output currents.

The fifth power mixing unit 15 has a fourth capacitor C4, a fifth capacitor C5, a sixth capacitor C6, a seventh capacitor C7, a third inductor L3, a fourth inductor L4, a fifth inductor L5, a sixth inductor L6, a seventh inductor L7, and an eighth inductor L8. The third inductor L3 is electrically connected in parallel with the fourth and fifth inductors L4, L5; two ends of the third inductor L3 are individually connected to one ends of the fourth and fifth capacitors C4, C5 in which the connection point of the one end of the third inductor L3 and the one end of the fourth capacitor C4 is the first connecting end 151 of the fifth power mixing unit 15. The sixth inductor L6 is electrically connected in parallel with the seventh and eighth inductors L7, L8; two ends of the sixth inductor L6 are individually connected to one ends of the sixth and seventh capacitors C6, C7; the one end of the sixth capacitor C6 is connected the one end of the fifth capacitor C5. The connection point of the one end of the sixth inductor L6 and the one end of the seventh inductor L7 is the other first connecting end 151 of the fifth power mixing unit 15. The connection point of the one end of the fifth capacitor C5 and the one end of the sixth capacitor C6 is the second connecting end 152 of the fifth power mixing unit 15. The other ends of the sixth and the seventh capacitors C6, C7 are connected to the grounded end GND.

When the plural first connecting ends 151 of the fifth power mixing unit 15 receive the operating voltages Vo5A, Vo5B (e.g., 12V) provided from the fifth power ends 315, 325 of the first and second power supplies 31, 32, the operating powers Vo5A, Vo5B are stabilized or averaged through the fourth and seventh capacitors C4, C7 and filtered through the third, fourth, and fifth inductors L3, L4, L5 and the sixth, seventh, and eighth inductors L6, L7, L8, and then mixed at the fifth and sixth capacitors C5, C6. In this way, the operating voltages Vo5A, Vo5B of the first and second power supplies 31, 32 can be coupled through the fifth and sixth capacitors C5, C6 to generate a stable averaged output voltage (i.e., the fifth output power Vo5).

Figure 4:
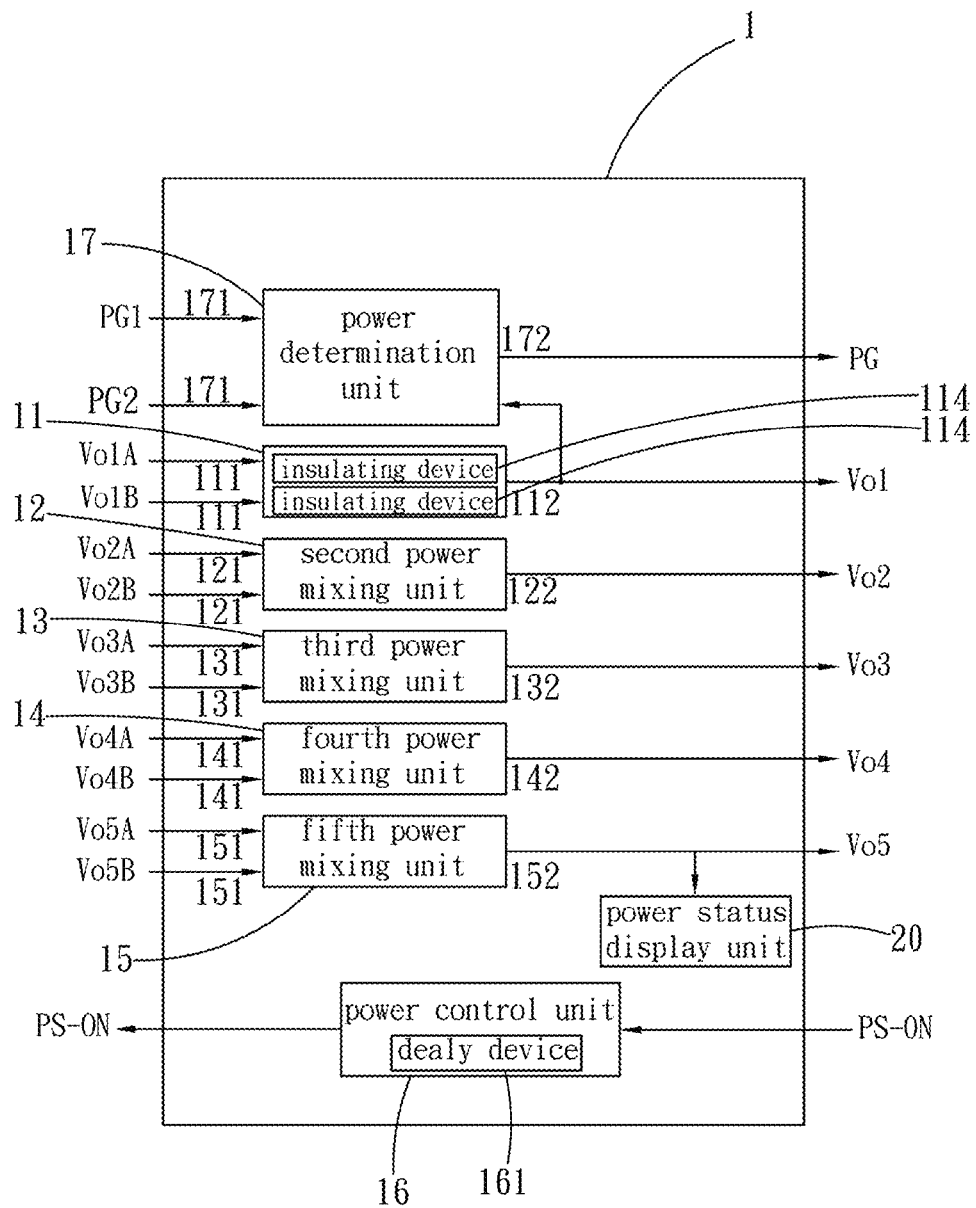
FIG. 4 shows the block diagram of the power mixing apparatus according to an alternative embodiment of the present invention.

In an alternative embodiment, referring to FIG. 4, the first power mixing unit 11 further comprises a plurality of insulating devices 114. In the current embodiment, the insulating devices 14 are Schottky diodes for explanation, but not limited to this. The insulating devices 114 are disposed between the first connecting ends 111 and the second connecting end 112 of the first power mixing unit 11. One end of each of the insulating devices 114 is correspondingly connected to the first connecting end 111 of the first power mixing unit 11 and the other end of each of the insulating devices 114 is correspondingly connected to the second connecting end 112 of the first power mixing unit 11. In this way, by means of the insulating devices 114, the operating voltages Vo1A, Vo1B (e.g., 5V) provided from the first power ends 311, 321 of the first and second power supplies 31, 32 will not interfere with each other to cause false action.

In the alternative embodiment, referring to FIG. 4, the power mixing apparatus 1 further comprises at least one power status display unit 20 which is an LED (light-emitting diode) and is connected to the second connecting end 152 of the fifth power mixing unit 15 to display whether the fifth power mixing unit 15 outputs the power. Therefore, when the power status display unit 20 continuously displays (e.g., shines), it means the fifth power mixing unit 15 is in an active mode and outputs the fifth output power Vo5. If the power status display unit 20 does not display (e.g., not shining), it means the fifth power mixing unit 15 is in an inactive mode and does not output the fifth output power Vo5. Thus, the user can know the current power status of the power supplies.

Figure 5:
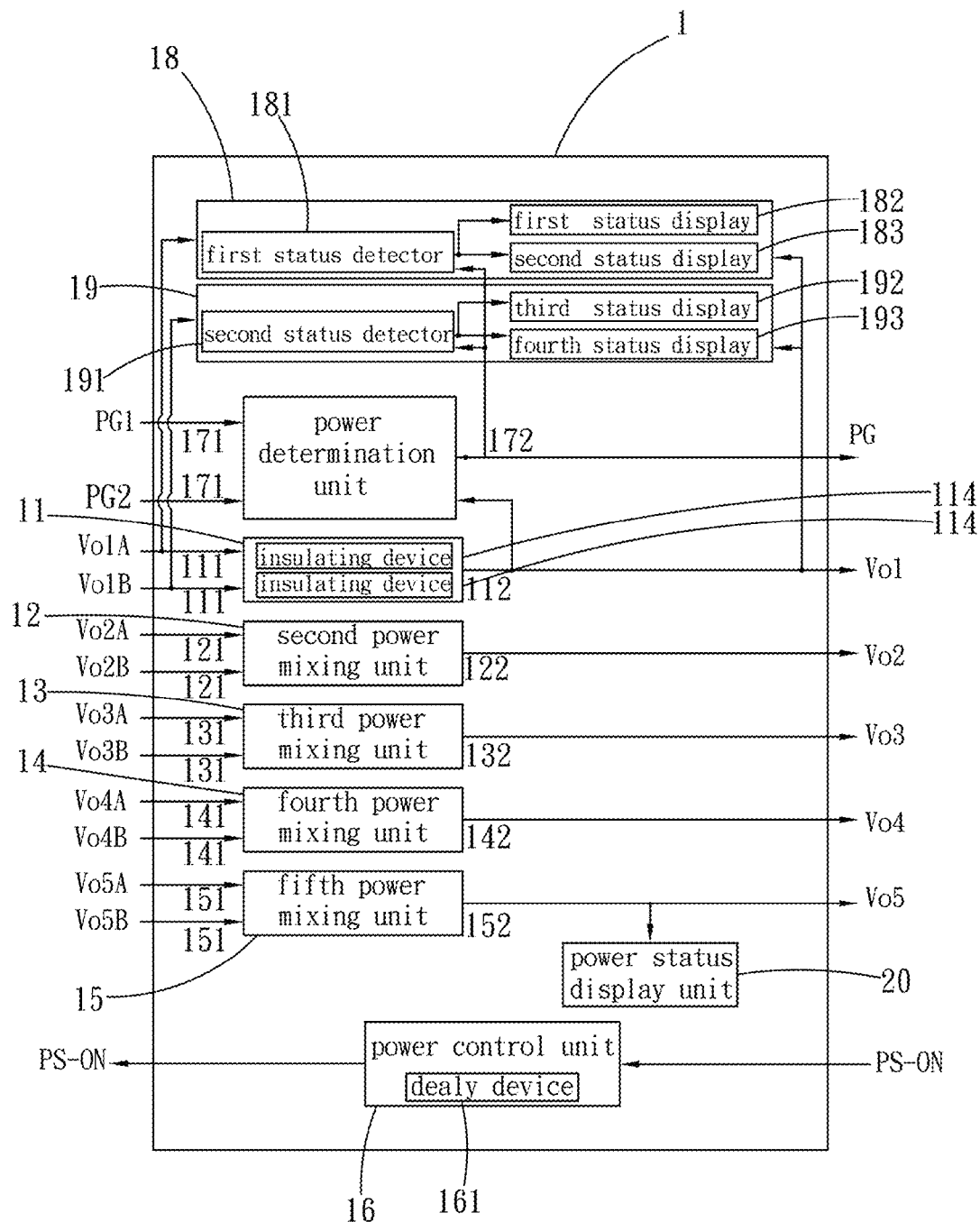
FIG. 5 shows the block diagram of the power mixing apparatus according to the second embodiment of the present invention.
Figure 6A:
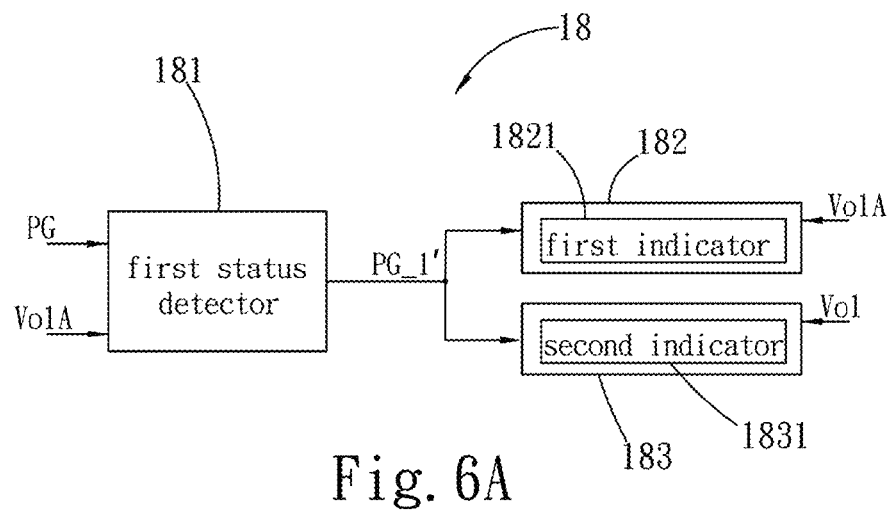
FIG. 6A shows the block diagram of the first power supply status unit according to the second embodiment of the present invention.
Figure 6B:
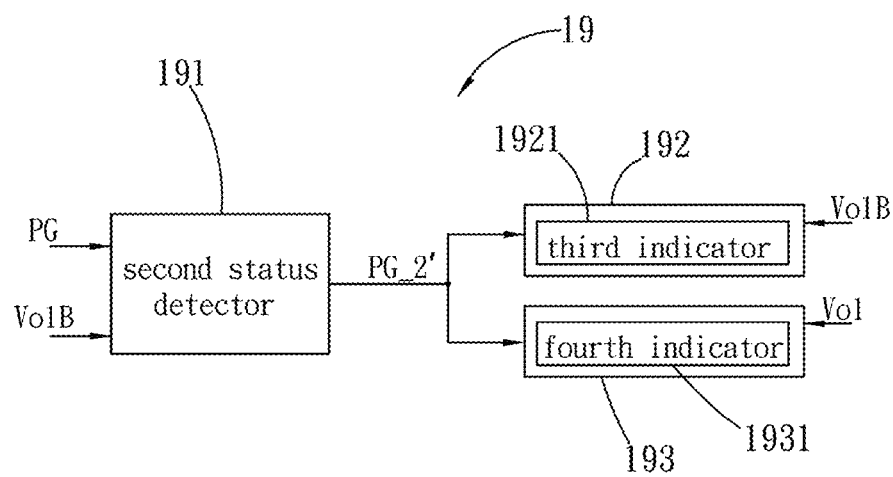
FIG. 6B shows the block diagram of the second power supply status unit according to the second embodiment of the present invention.

Please refer to FIGS. 5, 6A, and 6B, which are the block diagrams of the power mixing apparatus according to the second embodiment of the present invention. Also, referring to FIG. 3A, the structural and connecting relation of the current embodiment are similar to those of the first embodiment and will not be described again here. The difference in between is that the power mixing apparatus 1 in the second embodiment further comprises a first power supply status unit 18 and a second power supply status unit 19. The first power supply status unit 18 comprises a first status detector 181, a first status display 182, and a second status display 183. The first and second status displays 182, 183 have a first indicator 1821 and a second indicator 1831, respectively. The first status detector 181 receives the power good signal PG and the operating power Vo1A provided from the first power end 311 of the first power supply 31. The first status detector 181 outputs a first trigger signal PG_1' at high or low level according to the presence of the operating power provided from the first power end 311 of the first power supply 31. For example, if the first status detector 181 checks the first power end 311 of the first power supply 31 does not provide the operating power, the first trigger signal PG_1' at high level will be output to the first and second status displays 182, 183. If the first status detector 181 checks the first power end 311 of the first power supply 31 does provide the operating power, the first trigger signal PG_1' at low level will be output to the first and second status displays 182, 183.

The first and second status displays 182, 183 are connected to the first status detector 181. If the first trigger signal PG_1' is at low level, the first indicator 1821 (e.g., a white indicator) of the first status display 182 will turn on and the second indicator 1831 (e.g., a red indicator) of the second status display 183 will not turn on. If the first trigger signal PG_1' is at high level, the first indicator 1821 of the first status display 182 will not turn on and the second indicator 1831 of the second status display 183 will turn on. In the current embodiment, when the first indicator 1821 of the first status display 182 turns on and shines, it means the operating power provided from the first power end 311 of the first power supply 31 operates normally, while when the second indicator 1831 of the second status display 183 turns on and shines, it means the operating power provided from the first power end 311 of the first power supply 31 operates abnormally (e.g., damaged or the alternating current power is turn off).

Moreover, the second power supply status unit 19 comprises a second status detector 191, a third status display 192, and a fourth status display 193. The third and fourth status displays 192, 193 have a third indicator 1921 and a fourth indicator 1931, respectively. The second status detector 191 receives the power good signal PG and the operating power Vo1B provided from the first power end 321 of the second power supply 32. The second status detector 191 outputs a second trigger signal PG_2' at high or low level according to the presence of the operating power provided from the first power end 321 of the second power supply 32. For example, if the second status detector 191 checks the first power end 321 of the second power supply 32 does not provide the operating power, the second trigger signal PG_2' at high level will be output to the third and fourth status displays 192, 193. If the second status detector 191 checks the first power end 321 of the second power supply 32 does provide the operating power, the second trigger signal PG_2' at low level will be output to the third and fourth status displays 192, 193.

The third and fourth status displays 192, 193 are connected to the second status detector 191. If the second trigger signal PG_2' is at low level, the third indicator 1921 (e.g., a white indicator) of the third status display 192 will turn on and the fourth indicator 1931 (e.g., a red indicator) of the fourth status display 193 will not turn on. If the second trigger signal PG_2' is at high level, the third indicator 1921 of the third status display 192 will not turn on and the fourth indicator 1931 of the fourth status display 193 will turn on. In the current embodiment, when the third status display 192 turns on and shines, it means the operating power provided from the first power end 321 of the second power supply 32 operates normally, while when the fourth status display 193 turns on and shines, it means the operating power provided from the first power end 321 of the second power supply 32 operates abnormally (e.g., damaged or the alternating current power is turn off).

Thus, when the alternating current (AC) input to the first and second power supplies 31, 32 are turned off, the first power ends 311, 321 of the first and second power supplies 31, 32 do not provide the operating powers and the power good signal PG output from the power determination unit 17 is at low level due to the computer system 4 not being turned on. At this moment, the first and third indictors 1821, 1921 of the first and third status displays 182, 192 do not turn on (i.e., the white indicators are off). If the first power supply 31 is turned on to receive the alternating current power, the first power end 311 of the first power supply 31 will provide the operating power Vo1A (i.e., 5VSB or called the stand-by power); however, the power good signal PG is still at low level. At this moment, the first indicator 1821 of the first status display 182 will be powered by the stand-by power of the first power supply 31 to shine, which means the first power supply 31 is available to provide electrical power, while because the second power supply 32 is not turned on, the first power end 321 of the second power supply 32 does not provide the operating power (i.e., 5VSB or called the stand-by power) and the power good signal is still at low level. The third and fourth indicators 1921, 1931 of the third and fourth status displays 192, 193 do not shine, which means the second power supply 32 does not provide electrical power.

Also, when either power supply (i.e., the first power supply 31 or the second power supply 32) has reached a stable state and output the power good signal PG to the mother board 41 through the power determination unit 17 such that the mother board 41 can recognize that either power supply 31 or 32 is ready to provide electrical power, the first and second status detectors 181, 191 output the first and second trigger signals at low level to the first and third indicators 1821, 1921 of the first and third status displays 182, 192, respectively, according to the presences of the operating powers of the first and second power supplies 31, 32 such that the first and third indicators 1821, 1921 shine to inform the user that the first and second power supplies 31, 32 operate normally. If the first or second power supply 31/32 is without the alternating current power input or is damaged, its first power end 311 will not provide the operating power such that first or second status detector 181/191 of the first or second power supply 31/32 can recognize the damaged first or second power supply 31/32 does not provide the operating power and then outputs the first or second trigger signal PG_1'/PG_2' at high level (the first or second trigger signal PG_1'/PG_2' changes from low level to high level). Further, the second or fourth indicator 1831/1931 of the second or fourth status display 183/193 turns to shine to inform the user that the first or second power supply 31/32 does not operate normally.

The first and second status detectors 181, 191 and the first, second, third, and fourth status displays 182, 183, 192, 193 of the present invention are disclosed below to carry out the more specific implementation technology of the present invention.

Figure 7A:
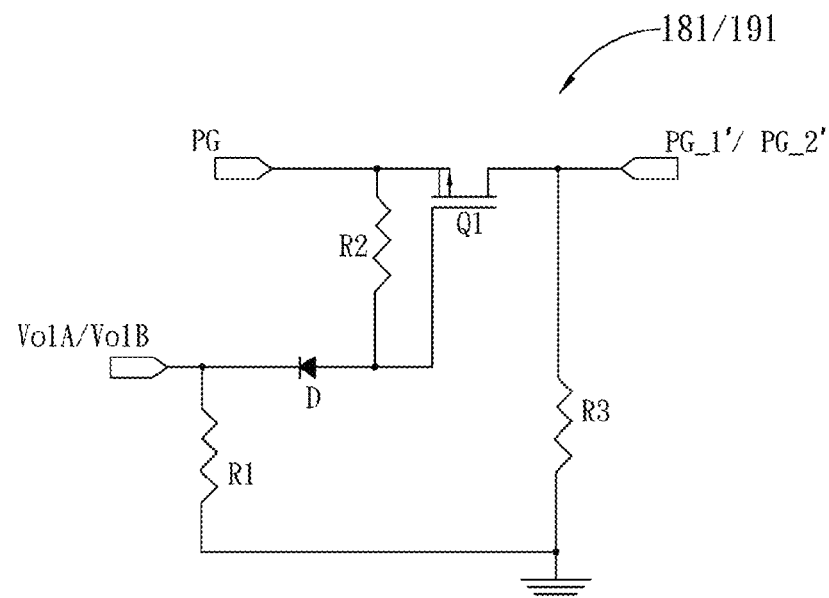
FIG. 7A shows the circuit schematic of the first and second status detectors according to the second embodiment of the present invention.
Figure 7B:
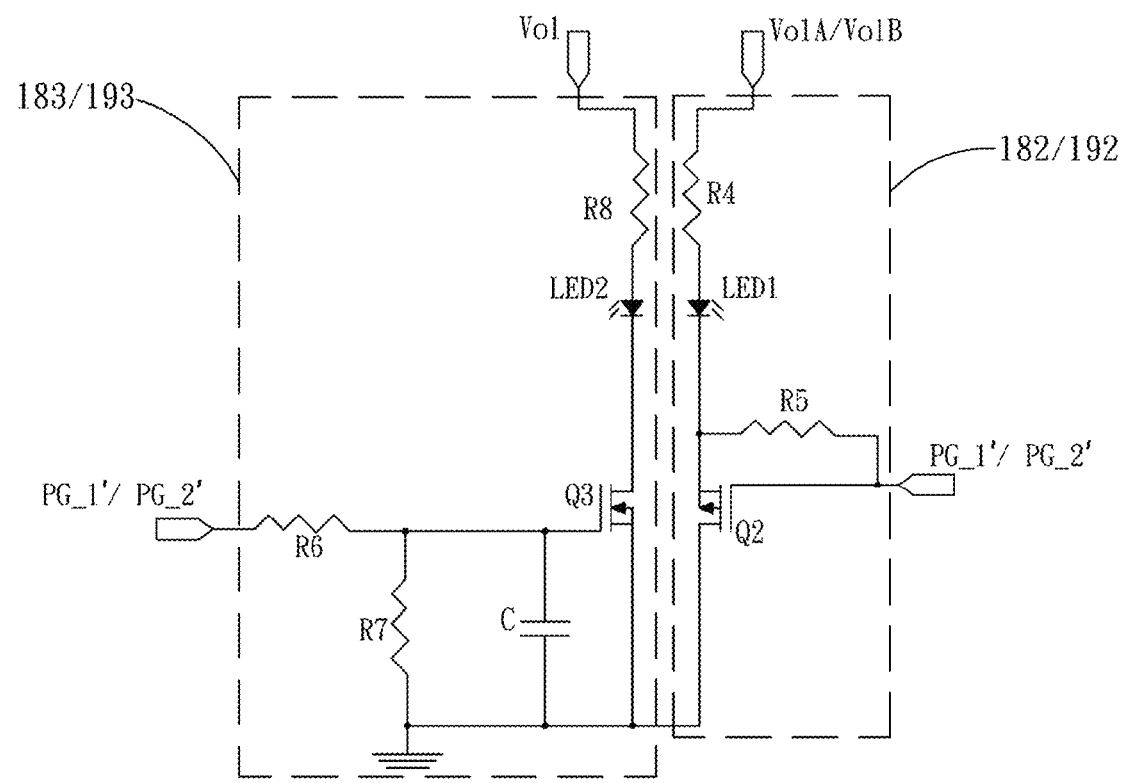
FIG. 7B shows the circuit schematic of the first, second, third, and fourth status displays according to the second embodiment of the present invention.

Please refer to FIGS. 7A and 7B. Each of the first and second status detectors 181, 191 has a first resistor R1, a second resistor R2, a third resistor R3, a diode D, and a first MOS transistor Q1. In the current embodiment, a PMOS transistor (p-type metal-oxide-semiconductor field-effect transistor) is used as an example of the first MOS transistor Q1, but not limited to this. One end (i.e., the cathode) of the diode D of the first status detector 181 is coupled to one end of the first resistor R1; the one end of the first resistor R1 is used to receive the operating power Vo1A (5VSB) provided from the first power end 311 of the first power supply 31. The other end of the first resistor R1 is coupled to a grounded end GND. One end of the second resistor R2 is coupled to the gate electrode of the first MOS transistor Q1 and the other end (i.e., the anode) of the diode D; the other end of the second resistor R2 is coupled to the source electrode of the first MOS transistor Q1 and receives the power good signal PG. One end of the third resistor R3 is coupled to the drain electrode of the first MOS transistor Q1 and outputs the first trigger signal PG_1'; the other end of the third resistor R3 is coupled to the grounded end GND. The electronic components (e.g., the first, second, and third resistors R1, R2, R3, the diode D, and the first MOS transistor Q1) of the second status detector 191 have the same structural and connecting relation as those of the first status detector 181 described above; thus they are not described again here. The small difference in between is that one end of the first resistor R1 of the second status detector 191 is used to receive the operating power Vo1B (5VSB) provided from the first power end 321 of the second power supply 32 and one end of the third resistor R3 of the second status detector 191 is used to output the second trigger signal PG_2'.

The first status display 182 has a second MOS transistor Q2, a fourth resistor R4, a fifth resistor R5, and a first light-emitting diode LED1. In the current embodiment, a PMOS transistor is used as an example of the second MOS transistor Q2, but not limited to this. One end of the fourth resistor R4 is used to receive the operating power Vo1A (5VSB) provided from the first power end 311 of the first power supply 31; the other end thereof is coupled to one end of the first light-emitting diode LED1. One end of the fifth resistor R5 is coupled to the other end of the first light-emitting diode LED1 and the drain electrode of the second MOS transistor Q2; the other end of the fifth resistor R5 is coupled to the gate electrode of the second MOS transistor Q2 and used to receive the first o trigger signal PG_1'. The drain electrode of the second MOS transistor Q2 is coupled to a grounded end GND. The electronic components (e.g., the fourth and fifth resistors R4, R5, the first light-emitting diode LED1, and the second MOS transistor Q2) of the third status display 192 of the second power supply status unit 19 have the same structural and connecting relation as those of the first status display 182 described above; thus they are not described again here. The small difference in between is that the other end of the fifth resistor R5 of the third status display 192 is used to receive the second trigger signal PG_2' and one end of the fourth resistor R4 is used to receive the operating power Vo1B (5VSB) of the first power end 321 of the second power supply 32.

The second status display 183 has a sixth resistor R6, a seventh resistor R7, an eighth resistor R8, a capacitor C, a third MOS transistor Q3, and a second light-emitting diode LED2. In the current embodiment, an NMOS transistor (n-type metal-oxide-semiconductor field-effect transistor) is used as an example of the third MOS transistor Q3, but not limited to this. One end of the sixth resistor R6 of the second status display 183 is used to receive the first trigger signal PG_1'. One end of the seventh resistor R7 is coupled to the other end of the sixth resistor R6, one end of the capacitor C, and the gate electrode of the third MOS transistor Q3; the other end of the seventh resistor R7 is coupled to the grounded end GND, the other end of the capacitor C, and the source electrode of the third MOS transistor Q3. Two ends of the second light-emitting diode LED2 are individually computed to the drain electrode of the third MOS transistor Q3 and one end of the eighth resistor R8. The other end of the eighth resistor R8 is used to receive the first output power Vo1. The electronic components (e.g., the sixth, seventh, and eighth resistors R6, R7, R8, the second light-emitting diode LED2, and the third MOS transistor Q3) of the fourth status display 193 of the second power supply status unit 19 have the same structural and connecting relation as those of the second status display 183 described above; thus they are not described again here. The small difference in between is that one end of the sixth resistor R6 of the fourth status display 193 is used to receive the second trigger signal PG_2'.

Besides, the first light-emitting diodes LED1 of the first and third status displays 182, 192 in the current embodiment are the previously-mentioned first and third indicators 1821, 1921; the second light-emitting diodes LED2 of the second and fourth status displays 183, 193 are the previously-mentioned second and fourth indicators 1821, 1921.

Therefore, when the first trigger signal PG_1' output from the first status detector 181 is at low level, the second MOS transistor Q2 turns on and the third MOS transistor Q3 turns off (or cuts off); at this moment, the first light-emitting diode LED1 will also turn on and the white indicator turns on to signal that the first power supply 31 operates normally. If the first trigger signal PG_1' output from the first status detector 181 is at high level, the third MOS transistor Q3 turns on and the second MOS transistor Q2 turns off (or cuts off); at this moment, the second light-emitting diode LED2 will turn on and the red indicator turns on to signal that the first power supply 31 operates abnormally.

In an alternative embodiment, if after the computer system 4 turns on and the second status detector 191 is expected to detect the power supply (e.g., the second power supply 32) which is not installed (or abnormal) and keep the indicator turned off, the user just removes the first resistor R1 of the second status detector 191. As a result, there is no impedance after the diode D on the path from the gate electrode of the first MOS transistor Q1 through the diode D to the ground, which is equivalent to an open circuit (invalid loop). Thus, the voltage at the gate electrode of the first MOS transistor Q1 equals to the power good signal PG which is at high level. At this moment, the first MOS transistor Q1 turns off and the second trigger signal PG_2' output from the second status detector 191 is kept at low level and transmitted to the second MOS transistor Q2 of the third status display 192. The second MOS transistor Q2 should have turn on due to the second trigger signal PG_2' at low level. However, the absence of the stand-by power causes the second light-emitting diode LED2 of the fourth status display 193 does not shine and the first light-emitting diode LED1 of the third status display 192 does not shine.

Therefore, by means of the first and second power supply status units 18, 19, the following situations can be checked in real time. Firstly, when either power supply is turned on and the computer system 4 is not turned on yet, whether the operation status is normal can be checked. Secondly, when the computer system 4 is turned on, whether the operating status of the power supply is normal can be checked. In this way, the user can realize which power supply has problems and perform the immediate replacement.

What is claimed is:

1. A power mixing apparatus of multiple power supplies, comprising:
    a plurality of power mixing units, each individually connected to a plurality of power supplies and to a mother board, wherein each of the power mixing units receives and filter-couples a plurality of different operating voltages of the power supplies to generate a stable averaged output voltage for the mother board; and
    a power control unit connected to the power supplies and the mother board, wherein the power control unit controls switching states of the power supplies according to a control signal transmitted from the mother board.

2. The power mixing apparatus of multiple power supplies according to claim 1, wherein the power mixing units comprise:
    a first power mixing unit,
    a second power mixing unit,
    a third power mixing unit,
    a fourth power mixing unit, and
    a fifth power mixing unit, wherein each of the first, second, third, fourth, and fifth power mixing units has a plurality of first connecting ends and at least one second connecting end, wherein the first connecting ends are connected to the power supplies correspondingly, wherein the second connecting ends are connected to the mother board.

3. The power mixing apparatus of multiple power supplies according to claim 2, wherein the power supplies comprises a first power supply and a second power supply, wherein each of the first and second power supplies has at least one first power end, at least one second power end, at least one third power end, at least one fourth power end, and at least one fifth power end, wherein the first, second, third, fourth, and fifth power ends of the first power supply are connected to the first connecting ends of the first, second, third, fourth, and fifth power mixing units, respectively, wherein the first, second, third, fourth, and fifth power ends of the second power supply are connected to the other first connecting ends of the first, second, third, fourth, and fifth power mixing units, respectively.

4. The power mixing apparatus of multiple power supplies according to claim 3, wherein the first power mixing unit receives and filter-couples the different operating voltages provided from the first power ends of the first and second power supplies to generate a first averaged output voltage, wherein the second power mixing unit receives and filter-couples the different operating voltages provided from the second power ends of the first and second power supplies to generate a second averaged output voltage, wherein the third power mixing unit receives and filter-couples the different operating voltages provided from the third power ends of the first and second power supplies to generate a third averaged output voltage, wherein the fourth power mixing unit receives and filter-couples the different operating voltages provided from the fourth power ends of the first and second power supplies to generate a fourth averaged output voltage, wherein the fifth power mixing unit receives and filter-couples the different operating voltages provided from the fifth power ends of the first and second power supplies to generate a fifth averaged output voltage, wherein averaged voltages of the first, second, third, fourth, and fifth averaged output voltages differ from one another.

5. The power mixing apparatus of multiple power supplies according to claim 3, further comprising a power determination unit having a plurality of input ends and at least one output end, wherein each of the first and second power supplies has a PG end which is connected to the corresponding input end of the power determination unit, wherein a first power good signal and a second power good signal transmitted from the PG ends of the first and second power supplies are received and determined by the power determination unit, wherein when either of the first and second power good signals is at high level, the power determination unit outputs a power good signal transmitted through the output end to the mother board.

6. The power mixing apparatus of multiple power supplies according to claim 5, further comprising a first power supply status unit and a second power supply status unit, wherein the first power supply status unit comprises a first status detector, a first status display, and a second status display, wherein the first and second status displays have a first indicator and a second indicator, respectively, wherein the first status detector receives the power good signal and the operating power provided from the first power end of the first power supply, wherein the first status detector outputs a first trigger signal at high or low level to the first and second status displays according to the presence of the operating power provided from the first power end of the first power supply,
wherein when the first trigger signal is at low level, the first indictor of the first status display turns on and when the first trigger signal is at high level, the second indictor of the second status display turns on.

7. The power mixing apparatus of multiple power supplies according to claim 6, wherein the second power supply status unit comprises a second status detector, a third status display, and a fourth status display, wherein the third and fourth status displays have a third indicator and a fourth indicator, respectively, wherein the second status detector receives the power good signal and the operating power provided from the first power end of the second power supply, wherein the second status detector outputs a second trigger signal at high or low level to the third and fourth status displays according to the presence of the operating power provided from the first power end of the second power supply, wherein when the second trigger signal is at low level, the third indictor of the third status display turns on and when the second trigger signal is at high level, the fourth indictor of the fourth status display turns on.

8. The power mixing apparatus of multiple power supplies according to claim 2, further comprising at least one power status display unit which is connected to the second connecting end of the fifth power mixing unit to display the output status of the fifth power mixing unit.

9. The power mixing apparatus of multiple power supplies according to claim 2, wherein the first power mixing unit comprises a plurality of insulating devices which are disposed between the first connecting ends and the second connecting end of the first power mixing unit, wherein one end of each of the insulating devices is correspondingly connected to the first connecting end of the first power mixing unit and the other end of each of the insulating devices is correspondingly connected to the second connecting end of the first power mixing unit.

10. The power mixing apparatus of multiple power supplies according to claim 9, wherein the insulating devices are Schottky diodes.

11. The power mixing apparatus of multiple power supplies according to claim 2, wherein each of the first, second, third, and fourth power mixing units has a first capacitor, a second capacitor, a third capacitor, a first inductor, and a second inductor, wherein two ends of the first inductor are individually connected to one ends of the first and second capacitors, wherein the other ends of the first and second capacitors are connected to a grounded end, wherein two ends of the second inductors are individually connected to one end of the second capacitor and one end of the third capacitor, wherein the other end of the third capacitor is connected to the grounded end.

12. The power mixing apparatus of multiple power supplies according to claim 11, wherein the fifth power mixing unit has a fourth capacitor, a fifth capacitor, a sixth capacitor, a seventh capacitor, a third inductor, a fourth inductor, a fifth inductor, a sixth inductor, a seventh inductor, and an eighth inductor, wherein the third inductor is electrically connected in parallel with the fourth and fifth inductors, wherein two ends of the third inductor are individually connected to one ends of the fourth and fifth capacitors, wherein the other ends of the fourth and fifth capacitors are connected to the grounded end, wherein the sixth inductor is electrically connected in parallel with the seventh and eighth inductors, wherein two ends of the sixth inductor are individually connected to one ends of the sixth and seventh capacitors, wherein the one end of the sixth capacitor is connected to the one end of the fifth capacitor, wherein the other ends of the sixth and seventh capacitors are connected to the grounded end.

* * * * *